Oct. 15, 1963     D. A. BERKOWITZ     3,107,303
POSITIVE OR NEGATIVE HIGH GAIN IMAGE AMPLIFIER
Filed Dec. 28, 1960     2 Sheets-Sheet 1
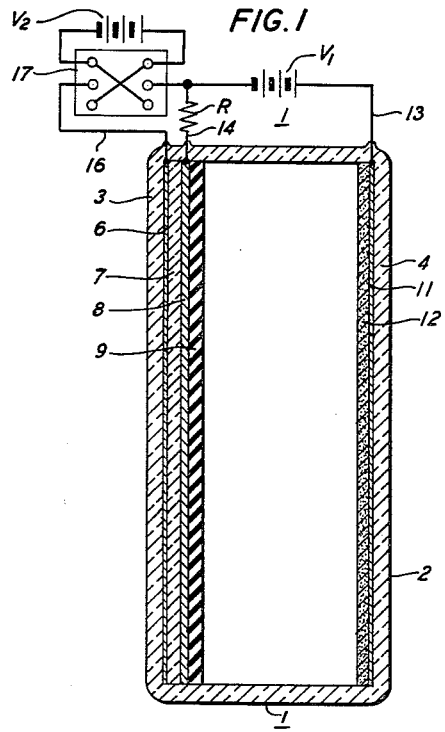
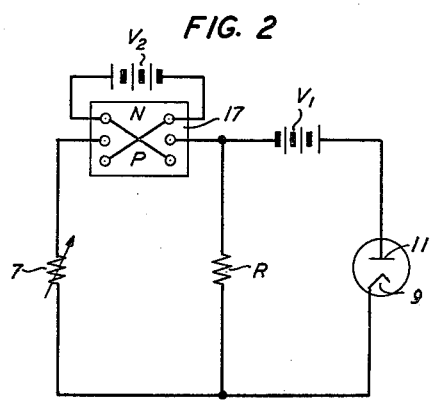
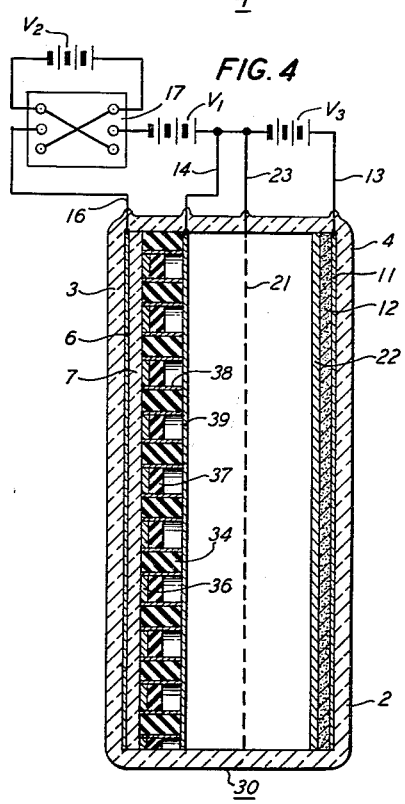
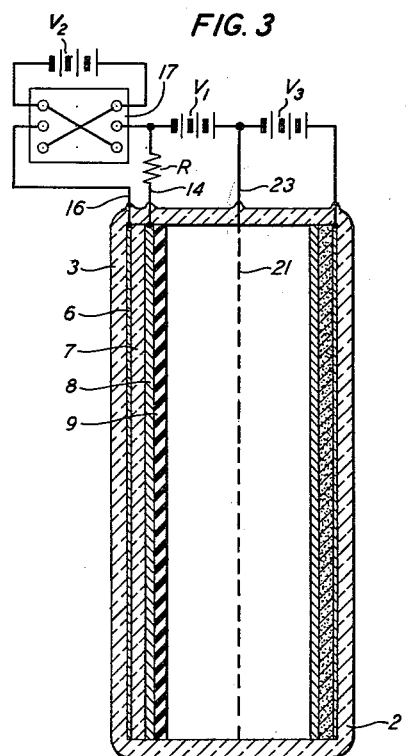
INVENTOR
D. A. BERKOWITZ
BY
ATTORNEY Oct. 15, 1963     D. A. BERKOWITZ     3,107,303
POSITIVE OR NEGATIVE HIGH GAIN IMAGE AMPLIFIER
Filed Dec. 28, 1960     2 Sheets-Sheet 2

INVENTOR
D. A. BERKOWITZ
BY
ATTORNEY

United States Patent Office 3,107,303
Patented Oct. 15, 1963

3,107,303
POSITIVE OR NEGATIVE HIGH GAIN
IMAGE AMPLIFIER
David A. Berkowitz, Allentown, Pa., assignor to Bell
Telephone Laboratories, Incorporated, New York,
N.Y., a corporation of New York
Filed Dec. 28, 1960, Ser. No. 79,068
7 Claims. (Cl. 250—213)

This invention relates to light amplifying and image intensifying devices. More particularly, it relates to light amplifiers and image intensifiers having very high gain in either a positive or a negative sense.

Conventional light amplifiers, such as are often used to intensify images or displays, may be characterized as positive gain light amplifiers. There are many applications, however, in which it is advantageous to have light amplifiers capable of providing either positive or negative intensified images. For instance, many image producing devices in which amplification or intensification is desirable to increase sensitivity, such as X-ray or infrared detectors, display negative images. Frequently, viewing and interpretation of such displays is aided by converting the negative image to a positive one. Additionally, an image intensifier capable of very high gain may be employed in optical projection systems, such as in television or motion picture systems. An image intensifier with positive or negative gain may be used in such systems for the continuous conversion of negative images to positive, or vice versa, or for special effects as well as for other purposes. In the past such devices have been characterized by a high degree of complexity, resulting from the use of electronic scanning techniques. The size and cost of the required supplementary equipment has prevented use of these systems in many applications where reversible gain light amplifiers or image intensifiers are desirable in principle.

Accordingly, an object of the present invention is light amplification and image intensification in either a positive or negative sense.

Another object of this invention is light amplification with very high gain by a device capable of continuously converting positive light signals to negative.

Still another object of the invention is to simplify apparatus for high gain light amplification or image intensification in either a positive or negative sense.

Various materials are known which are characterized by an electrical resistivity that varies according to incident light energy. Such materials are described as "photoconductors" and the phenomenon of varying resistivity in response to incident light is known as "photoconductivity." Many light-responsive and light-amplifying devices using the special properties of photoconductors are known in the prior art. Thus, in one class of devices the varying resistance of a photoconductive element under the influence of incident signal light is used to modulate an alternating electric field applied to an electroluminescent element. In still other types of light amplifiers the particular properties of photoconductors have been utilized to modulate the emission of electrons from photoemissive surfaces, and to modulate the flow of electrons in gaseous discharges. Such devices known in the prior art have suffered from the above-mentioned disadvantages.

In an illustrative light amplifier embodying the present invention there is provided an evacuated envelope containing a planar diode comprising an electron emissive cathode spaced from and in plane parallel relation to a transparent phosphor-coated anode. Following the principles of the invention the cathode advantageously is a cold cathode of the field-secondary emitter type, such as are known to those skilled in the art. The planar surface of the cathode facing away from the anode is in electrical contact with one surface of a thin intermediate conductive layer, the other surface of which in turn is in surface electrical contact with a photoconductive element. The opposite face of the photoconductive element is coated with a transparent conductive input layer. The diode is biased by a voltage source connected to the transparent anode and, through a resistance, to the conductive layer intermediate the cathode and the photoconductive element. A second voltage source is connected to the transparent input layer and, through the same resistance, to the intermediate layer, thereby biasing the photoconductor. A switch is provided for reversing the photoconductor bias and, consequently, changing the sign of the gain factor of the amplifier.

In order to preserve the resolution of an image formed at the input end of a device embodying the invention, it is necessary to limit the lateral conductivity of the conductive layer intermediate the photoconductor and the cathode to a value substantially smaller than that of its transverse conductivity. Ideally, an image intensifier with high resolution comprises an array of elemental light amplifying cells such as the illustrative embodiment just described. However, good results are generally obtained with an array of elemental light amplifiers based on a common photoconductive layer.

In a second illustrative embodiment of the invention there is provided an image intensifier comprising, in an evacuated envelope, a transparent conductive input layer, a photoconductive layer, and a mosaic of elements on said photoconductive layer, each element having an intermediate conductive layer and an electron emissive cathode layer forming an elemental cathode. The elemental cathodes advantageously comprise cold emitters of the field-secondary type. Also within the envelope, separated by a gap from the cathode layer and in plane parallel relation thereto, is a transparent phosphor coated anode. A first voltage source is connected to the phosphor coated anode and, through a resistance, to the intermediate conductive elements, thereby biasing the common anode with respect to the elemental cathode layers. A second voltage source is connected to the input layer and, through the resistance, to the intermediate conductive elements, thereby biasing the photoconductor. A switch is provided for reversing the polarity of the photoconductor bias and consequently the gain factor of the intensifier.

The objects and features of the invention will be fully and clearly understood from the following discussion taken in conjunction with the drawing in which:

FIG. 1 is a diagrammatic cross section of a light amplifying cell embodying the invention;

FIG. 2 illustrates schematically an equivalent circuit of the embodiment shown in FIG. 1;

FIG. 3 is a diagrammatic cross section of a slightly modified form of the embodiment illustrated in FIG. 1;

FIG. 4 is a diagrammatic cross section of an image intensifier embodying the invention;

For simplicity, equivalent elements are designated by the same reference number throughout the figures of the drawing.

Figure 5:
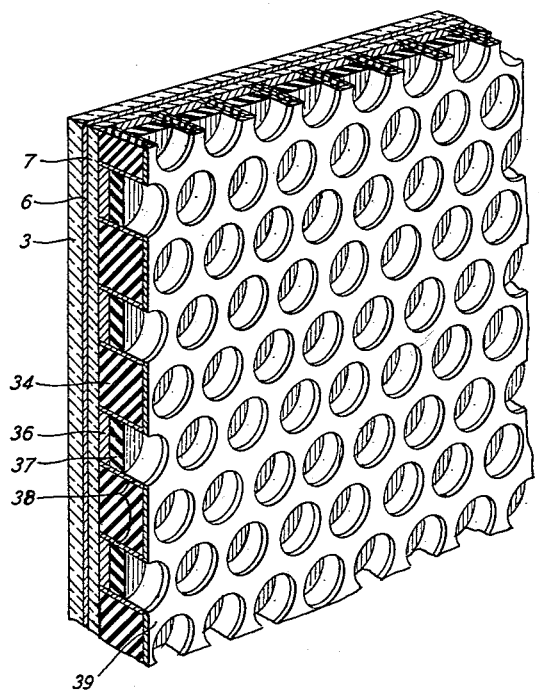
FIG. 5 illustrates diagrammatically the construction of an input screen of an image intensifier of the type illustrated in FIG. 4.

The light amplifier 1 shown in FIG. 1 comprises an evacuated envelope 2 having transparent end walls 3 and 4. The inner surface of the transparent wall 3 supports a laminar structure comprising a transparent conductive input layer 6, a photoconductive layer 7, an intermediate conductive layer 8, and an electron emissive cathode layer 9.

The laminar structures in the illustrative embodiment may be built up according to techniques well known in the electron tube art. For instance, the transparent conductive layer 6 might be formed by depositing tin oxide on the inner surface of the wall 3 and then heating to a temperature near the softening point of the glass to establish a firm bond. Alternatively, a suitable conductive glass may be used, several types being available commercially.

The inner surface of the transparent wall 4 supports a laminar structure comprising a transparent conductive output layer 11 and a phosphor layer 12. Other means of supporting the laminar structures will be apparent to workers in the art. Thus, for example, the laminar may be deposited on transparent supporting members separate and distinct from the end walls 3 and 4 of the envelope 2.

Leads 13, 14, and 16 are brought out through the walls of the envelope 2 for connecting the conductive layers 11, 8, and 6 respectively to an external circuit which comprises a voltage source $V_2$, a switch 17, a resistance R, and a voltage source $V_1$. The switch 17 is shown in the drawing as a double-pole double-throw switch for reversing the polarity of the source $V_2$ and thereby reversing the direction of the bias on the photoconductive layer 7. When the leads are connected to the external circuit the voltage source $V_2$ is in series circuit relation with the variable resistance of the photoconductor layer 7 and these elements are in parallel circuit relation with the resistance R. A third parallel circuit branch is formed between layers 11 and 9 in series circuit relation with $V_1$. The material forming the photoconductive layer 7 is generally chosen for sensitivity to radiation of the incident wavelength. The method of depositing the photoconductor in the layer 7 depends somewhat on the particular substance. Numerous materials are available having a variety of characteristic response times, light-to-dark resistivity ratios and wavelength sensitivities. For example, a material suitable for operation in the visible spectrum is cadmium sulfide which has an approximately linear response between a dark resistivity of $10^4$ ohm centimeters and a resistivity of $10^{-2}$ ohm centimeters under one foot candle of visible radiation. The full change from dark to light resistivity takes place in about .3 second, and the reverse change occurs in about .05 second.

The transparent conductive layer 11 may be of the same constituency and deposited in the same operation as layer 6. The phosphor layer 12 will generally be chosen for brightness or efficiency and color of the light emitted under electron bombardment, and may be deposited by well-known methods. A suitable phosphor is P4 which is widely used in television picture tubes. The cathode or emissive layer 9 is advantageously a cold cathode of the MgO type, which has been characterized as a field-secondary emitter. Emission from such a cathode surface may be started, for example, by bombarding it with electrons or by irradiating it with ultra-violet light. Once emission has been started, the starting stimulus may be discontinued. The cathode continues to emit electrons under the influence and control of the applied field. Advantageously, the intermediate conductive layer 8 is itself, or in combination with the cathode layer 9, substantially opaque to incident radiation of the wavelength at which the device operates and to visible radiation. In this manner the incident radiation is prevented from interfering with the output screen, and undesirable feedback from the screen to the photoconductor is eliminated.

Operation of the embodiment 1 as a negative gain light amplifier may be clearly understood from a consideration of the equivalent circuit shown in FIG. 2. For negative gain the switch 17 is thrown to the N position, connecting the positive terminal of source $V_2$ to the conductive layer 6 and the negative terminal of source $V_2$ to the intermediate layer 8 through the resistance R, which will normally have a small value compared to the dark resistance of the photo-conductive element 7. With no light input, the photo-conductive resistance is large compared to the resistance R so that a voltage drop, nearly equal in magnitude to $V_2$, appears across the photoconductor 7 and current flows primarily in the circuit loop comprising R, $V_1$ and the vacuum diode formed by the cold cathode 9 and the anode 11. The diode bias voltage $V_1$ is sufficiently large to maintain a high rate of electron emission from the cathode 9, well above the minimum necessary to keep the cathode "alive" after starting and sufficient to produce the maximum desired brightness on the output screen. The emitted electrons are accelerated in the field between the electrodes 9 and 11, and impinge on the phosphor screen 12 where they produce light. Thus minimum light input produces maximum light output.

When light falls on the photoconductive layer 7 its resistance decreases and current flow increases in the circuit. The current through and, consequently, the voltage drop across, the resistance R are increased, causing a drop in the voltage across the diode. The diode current is reduced according to a function which depends on the nature of the cathode, thus reducing the light output from phosphor layer 12.

Quantitative aspects of the device can be determined from a transfer function relating light input $L_1$ to light output $L_2$ and derived as follows:

It is known that the emission current from an MgO type cold cathode in a diode configuration is characterized over a range by the relation $$i_D = Ae^{BV}D \qquad (1)$$

where $i_D$ is the emission current, A and B are constants determined by the material of the cathode, and $V_D$ is the voltage applied to the diode.

The photoconductor response to incident light energy can be represented by the empirical relation $$i_{PC} = k_1 L_1^n V_{PC}^m = \frac{V_{PC}}{R_{PC}} \qquad (2)$$

where $i_{PC}$ is the photocurrent obtained with incident light energy $L_1$ and applied voltage $V_{PC}$, and $R_{PC}$ is the resistance of the photoconductor. The exponents $n$ and $m$ are constant for a given photoconductor and the range for various materials is about .5 to 5.

In the simplest case the response of the phosphor is linear and the light output $L_2$ is directly proportional to $i_D$.

$$L_2 = k_2 i_D \qquad (3)$$

By analysis of the circuit illustrated in FIG. 2, it can be shown that, with switch 17 in the N position for negative gain, $$L_1 = \left(\frac{B^{m-1}}{k_1 R}\right) \frac{B(V_1 - i_D R) - \ln\left(\frac{i_D}{A}\right)}{\left[\ln\left(\frac{i_D}{A}\right) - B(V_1 - V_2)\right]^m}^{\frac{1}{n}} \qquad (4)$$

This equation cannot be solved explicitly for $i_D$ (or $L_2$). However, if the input is taken to be the photoconductor resistance $R_{PC}$, then, from Equations 2, 4 and the loop equations for the circuit of FIG. 2, $$R_{PC} = \frac{R\left[\frac{1}{B}\ln\left(\frac{i_D}{A}\right) - (V_1 - V_2)\right]}{(V_1 - i_D R) - \frac{1}{B}\ln\left(\frac{i_D}{A}\right)} \qquad (5)$$

Equation 5 is helpful when $R_{PC}$ can be taken as an independent input variable, i.e., when $R_{PC}$ is independent of voltage or, equivalently, when $m=1$ in Equation 2.

The embodiment 1 can be converted to a positive gain amplifier by throwing the switch 17 to position P, thus connecting the positive terminal of $V_2$ to the intermediate conductive layer 8 through R, and the negative terminal of $V_2$ to the conductive layer 6. Equations 4 and 5 apply with only the sign of $V_2$ changed. Operation of the positive gain amplifier is similar to the negative gain configuration. Light input decreases the photoconductor resistance, increasing the current flowing in the circuit loop comprising the photoconductor 7, the source $V_2$ and the resistance R. However, the photoconductor loop current through R now opposes the current through R due to $V_1$. Thus the voltage drop across R is decreased, the voltage across the diode is increased and, consequently, the emission current from the cathode 9 and light output from the phosphor layer 12 are increased.

It is a characteristic of the MgO type cold cathode that it must be started externally. Once started, however, it is only necessary to maintain a minimum keep-alive current to insure rapid response to future voltage changes. Skellet, Firth and Mayer have reported in Proceedings of the IRE, vol. 47, page 1704, (1959), that an MgO cathode of area 2.43 cm.$^2$, requiring a keep-alive current of $10^{-6}$ amperes, will switch to $3 \times 10^{-3}$ seconds. An image intensifier according to the present invention and utilizing such a cathode is suitable for use in television systems, provided other components do not limit its frequency response.

When a cathode of the MgO type is utilized in a positive gain light amplifier according to this invention, the external voltage sources may be advantageously adjusted so that once started, the cathode would never emit less than the keep-alive current. The maximum value of $V_1$ is limited only by the largest permissible keep-alive current which is to flow in the diode with no light input. If the device is used as a negative gain amplifier, however, excessively bright input signals will interrupt the cathode emission and turn the device off. For this reason, it is desirable that restarting means be provided. Such means may take the form of a small radioactive source within the enclosure. Many other restarting means will be apparent to workers in the art. Instead of providing means for restarting the cathode after each interruption, it may be more desirable in some applications to protect against interruption initially. For instance, it is advantageous in some circumstances to employ a photoconductive layer that "saturates" at or below the input level which when exceeded, will turn the cathode off. The saturation point of typical photoconductors depends on the magnitude of the applied voltage and the preparation of the material.

The output brightness level depends on the properties of the phosphor, the electron current and the accelerating voltage. In the device 1 shown in FIG. 1 the energy of the bombarding electrons is limited to $V_1$ less the voltage drop in the resistance R and in the MgO cathode. It can be seen from Equation 4 that the gain of the amplifier depends somewhat on the value of R. However, workers in the art will understand that it is desirable that the power dissipation in R be negligible when the maximum diode current flows through it, so that other means of increasing the energy of the electron bombardment are preferred.

For instance, the structure may be modified as shown in FIG. 3 by the addition of an intermediate grid 21 which is maintained at potential $V_1$ with respect to the cathode 9. The phosphor screen 12 is maintained at a high potential $V_3$ with respect to the grid 21. Some of the electrons emitted by the cathode 9 would be collected by the grid 21, but most of them will be accelerated toward the screen and made much more effective in exciting the phosphor. The phosphor layer in the embodiment 20 of FIG. 3 is coated with a thin aluminum film 22, a well-known technique for increasing the efficiency and prolonging the life of the phosphor. An output brightness of 20,000 foot-lamberts may be obtained from a P-20 type phosphor with a current density of 30 $\mu$amp./cm.$^2$ at 15K energy. Continuous operation at brightness levels about 20,000 foot-lamberts requires cooling of the output screen on which the phosphor is deposited. Such brightness levels are sufficient for projection purposes.

The total change in the photoconductor resistance $R_{PC}$ may be achieved with input light levels of less than .05 foot-lamberts. For instance, with a photoconductive layer 9 comprising cadmium sulfide the dark-resistivity is approximately $10^6$ ohms. If sufficient cooling of the output screen is provided to allow output brightnesses of up to 50,000 foot-lamberts, the highlight gain from a device using a P4 phosphor layer would be of the order of $\pm 10^6$. Equation 1 is applicable to the MgO cathode over a range extending from about $1.2 \times 10^{-3}$ amps./cm.$^2$ to about $4.1 \times 10^{-7}$ amps./cm.$^2$. If the diode is limited to this range, then the maximum output contrast ratio will be about 3000.

In light amplifying cells of the type disclosed above and illustrated in FIGS. 1 and 3 the resolution of an image projected upon the photoconductive layer is degraded by the conductivity of the intermediate layer 8, which tends to act as an equipotential layer, distributing more or less evenly the image-produced surface variations of the photoconductor current. To preserve the resolution and definition of the incident image to be intensified, it is advantageous to replace the continuous conductive layer 8 with a mosaic of small area conductive elements electrically separated from each other by relatively nonconducting elements forming, in effect an array of light amplifying cells according to the invention. In general it is desirable that the resistance along the layer from cell to cell be at least ten times larger than the resistance through the layer from the photo-conductor 7 to the cathode layer 9.

Further degradations of the incident image to be intensified are the result of the dispersive characteristics of electron emission from the surface of the cathode layer 9, and of the tendency of that layer, due to field effects within the dielectric emitter material, to spread the image induced local potential variations supplied by the above-described mosaic of layer 8. The degrading effect due to these factors may be minimized by replacing the cathode layer 9 with a mosaic of cathode elements corresponding to an underlying conductive mosaic substantially as described. Most advantageously, an image intensifier according to the invention comprises a mosaic formed by a plurality of elemental light amplifying cells, each having input and output laminar structures such as those in the embodiments illustrated in FIGS. 1 and 3. Such a structure, however, is complicated and difficult to manufacture. It may be simplified by including within a single evacuated envelope a common output screen comprising a transparent conductive anode layer coated with a phosphor layer, and a laminar input structure comprising a transparent conductive input layer, and a mosaic of light amplifier elements, each of which has a photoconductive layer, an intermediate conductive layer, and an electron emissive cathode layer. Construction of the image intensifier may be further simplified by using a continuous photoconductive layer instead of a mosaic of photoconductor elements. Satisfactory results may be obtained so long as the intermediate conductive elements of the various cells are separated by relatively nonconducting elements.

Figure 6:
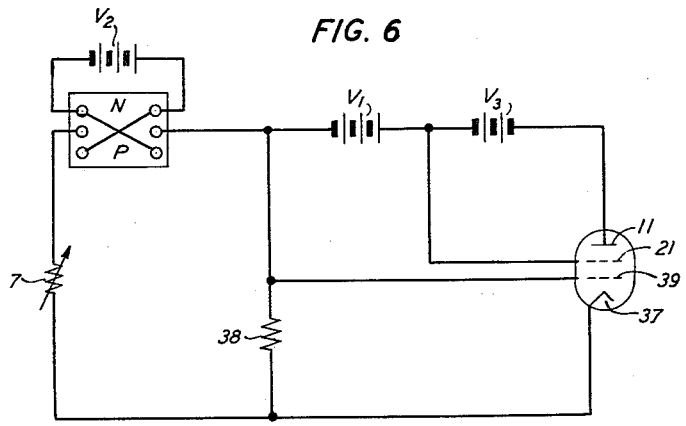
FIG. 6 shows in schematic form an equivalent circuit of a single light amplifying cell of an embodiment using an input screen of the type depicted in FIG. 5.

A preferred embodiment of an image intensifier in accordance with the invention is illustrated in FIG. 4. The device utilizes a laminar input structure substantially as depicted in FIG. 5. There is shown deposited on the transparent supporting member 3 a transparent conductive input layer 6 and a photoconductive layer 7. The layer 7 carries an array of elemental light amplifying cells each of which comprises an intermediate conductive layer 36 and an electron emissive cathode layer 37. The cells are separated from each other by an insulating mesh substrate 34 the side walls of which are covered with a resistive coating 38. The top of the mesh substrate 34 supports a conductive layer 39 which is conductingly connected to the intermediate conductive elements 36 through the resistive coating 38. An equivalent circuit of a single light amplifying cell of the image intensifier 30 is shown in FIG. 6.

The conductive layer 39 in the embodiment 30 effectively introduces another grid. The effect of this grid can be minimized by making the holes large compared to the spacing between them. However, the grid may also be advantageously used to provide an internal positive feedback which will increase the sensitivity of the amplifier. This may be understood from the equivalent circuit diagram shown in FIG. 6. With switch 17 in the P position, the potential of the layer 39 is held at O. The potential of conducting layer 36 with respect to layer 39 is negative. If a change in the resistance of the photoconductor 7 causes the potential of the layer 36 to approach O, the emission current from the cathode 37 decreases. The presence of the grid-like layer 39 causes a larger decrease in the surface field at the cathode than would otherwise occur. This results in yet a further reduction in the emission current. If the change in the photoconductor resistance causes the layer 36 to become more negative with respect to the layer 39, a similar effect works to increase the emission current.

The laminar input structure illustrated in FIG. 5 may be formed by depositing the resistive layer 38 on a glass or insulator-clad metal screen forming the mesh substrate 34. The layer 38 might comprise, for example, tin oxide chemically deposited according to techniques well known in the electron tube art. The coating should be removed from the back of the mesh to insure relative isolation of the elemental cells. However, this step is not necessary if the resistance between adjacent cells is about ten or more times as large as the maximum operating resistance of the photoconductor in that cell. The coated mesh is bonded to the photoconductive layer 7. This may be accomplished during the sintering process of the photoconductor. The conductive layers 36 may be formed by evaporation from a source far away from the mesh to avoid deposition of evaporated metal on the resistive walls of each cell. Many known techniques are available for the deposition of the MgO cathode layer, including spraying with the oxide and oxidation of the metal film.

It can be seen that the invention is an unusually simple and economical device for achieving positive or negative light amplification and image intensification without complex electronic circuitry.

Many alternative modes of practicing the invention will be apparent to those skilled in the art to which it pertains. The foregoing, therefore, is to be understood as exemplary and illustrative and not as restrictive of the scope of the invention which is defined in the claims.

What is claimed is:

1. A light amplifier having a reversible gain factor and comprising first and second laminar structures, said first laminar structure having a transparent conductive input layer, a photoconductive layer, an intermediate conductive layer, and an electron emissive cathode layer; said second laminar structure having a phosphor layer and a transparent conductive output layer; an evacuated envelope having first and second transparent portions, said laminar structures being positioned within said evacuated envelope with said input and output layers in light transmitting relation to said first and second transparent portions, respectively, and with the cathode layer of said first laminar structure separated by a gap from the phosphor layer of said second laminar structure, means for maintaining said output layer at a positive potential with respect to said intermediate conductive layer, and means including a voltage source in series with said input layer and resistance means in parallel with said input layer and said source for establishing a potential difference across said photoconductor layer, and means for reversing the effective polarity of the voltage source.

2. A light amplifier as in claim 1 wherein said intermediate conductive layer is substantially opaque to light of the wavelength to be amplified.

3. A light amplifier as in claim 1 wherein said intermediate conductive layer and said cathode layer in combination are substantially opaque to light of the wavelength to be amplified.

4. A light amplifier as in claim 1 and further comprising a grid positioned in the evacuated space between said first and second laminar structures, and means to be connected to a voltage source for maintaining said grid at a positive potential with respect to said intermediate conductive layer.

5. An image intensifier with positive or negative gain comprising a first laminar structure having a transparent conductive input layer, a photoconductive layer, and a mosaic of laminar elements on said photoconductive layer, each of said elements comprising an elemental intermediate conductive layer and an elemental electron emissive cathode layer; a second laminar structure comprising a phosphor layer and a transparent conductive output layer, an evacuated envelope having first and second transparent portions, said first and second laminar structures being positioned within said envelope with said input and output layers in light transmitting relation to said first and second transparent portions respectively, and with said mosaic of laminar elements on said first structure separated by a gap from said phosphor layer on said second structure, means supporting said laminar structures, means including a voltage source in series with said input layer for establishing reversible potential differences between said input layer and said elemental intermediate conductive layers, and means for maintaining said output layer at a positive potential with respect to said elemental intermediate conductive layers, thereby maintaining said output layer at a positive potential with respect to said elemental cathode layers.

6. An image intensifier as in claim 5 and further comprising a grid positioned within said envelope in the gap between said laminar structures, and means for maintaining said grid at a positive potential with respect to said cathode elements.

7. An image intensifier with positive or negative gain, comprising a first laminar structure having a transparent conductive input layer, a photoconductive layer, an insulating mesh having a resistive coating, and a coincident conductive mesh, the interstices of said mesh containing intermediate conductive elements in electrical contact with said resistive coating and said photoconductive layer and electron emissive cathode elements in electrical contact with said intermediate conductive elements, a second laminar structure comprising a phosphor layer and a transparent conductive output layer, an evacuated envelope having first and second transparent portions, said laminar structures being positioned within said envelope with said input and output layers adjacent to said first and second transparent portions respectively and with said conductive mesh layer of said first laminar structure separated by a gap from said phosphor layer of said second laminar structure, a grid positioned in said gap, means including a voltage source in series with said input layer for establishing a reversible potential difference between said input layer and said conductive mesh layer, thereby establishing a potential difference between said input layer and said intermediate conductive layers, and means for maintaining said grid at a positive potential with respect to said conductive mesh layer, thereby maintaining said grid at a positive potential with respect to said intermediate conductive layers.

References Cited in the file of this patent
UNITED STATES PATENTS

| 2,929,935 | Lempert | Mar. 22, 1960 |
| 2,943,205 | Kazan et al. | June 28, 1960 |
| 2,957,991 | Kazan | Oct. 25, 1960 |
| 2,970,219 | Roberts et al. | Jan. 31, 1961 |
| 3,064,133 | Murr et al. | Nov. 13, 1962 |